United States Patent [19]

Peters et al.

[11] 4,373,015

[45] Feb. 8, 1983

[54] ELECTRIC STORAGE BATTERIES

[75] Inventors: Kenneth Peters, Worsley; Barry Culpin, Bolton, both of England

[73] Assignee: Chloride Group Limited, London, England

[21] Appl. No.: 229,565

[22] PCT Filed: Apr. 25, 1980

[86] PCT No.: PCT/GB80/00081

§ 371 Date: Jan. 9, 1981

§ 102(e) Date: Jan. 9, 1981

[87] PCT Pub. No.: WO80/02471

PCT Pub. Date: Nov. 13, 1980

[30] Foreign Application Priority Data

May 9, 1979 [GB] United Kingdom ............... 7916119

[51] Int. Cl.$^3$ ............................................ H01M 10/06
[52] U.S. Cl. ...................................... 429/57; 429/204; 429/225; 429/250
[58] Field of Search ............................... 429/247–250, 429/204, 225–228, 57

[56] References Cited

U.S. PATENT DOCUMENTS

| | | | |
|---|---|---|---|
| 3,344,013 | 9/1967 | Fahrbach et al. | 429/247 X |
| 3,472,700 | 10/1969 | Kollman et al. | 429/250 |
| 3,749,604 | 7/1973 | Langer et al. | 429/251 X |
| 3,861,963 | 1/1975 | Arrance et al. | 429/251 |
| 3,862,861 | 1/1975 | McClelland et al. | 429/57 |
| 4,053,695 | 10/1977 | Peters et al. | 429/225 |
| 4,119,772 | 10/1978 | Peters et al. | 429/204 |
| 4,216,280 | 8/1980 | Kono et al. | 429/247 |
| 4,233,379 | 11/1980 | Gross et al. | 429/247 |
| 4,262,068 | 4/1981 | Kono et al. | 429/247 X |

FOREIGN PATENT DOCUMENTS 534618 7/1939 United Kingdom ............... 429/250

*Primary Examiner*—Anthony Skapars
*Attorney, Agent, or Firm*—Oblon, Fisher, Spivak, McClelland & Maier

[57] ABSTRACT

Recombination lead acid electric storage battery of sealed or recombinant type in which the gas evolved during operation or charging is induced to recombine within the battery at the battery electrodes.

9 Claims, 4 Drawing Figures

—50 MICRONS 200×

1000×
—10 MICRONS

ELECTRIC STORAGE BATTERIES

TECHNICAL FIELD

The present invention relates to lead acid electric storage batteries, and is particularly concerned with such batteries of sealed or recombinant type in which the gas evolved during operation or charging is induced to recombine within the battery at the battery electrodes.

BACKGROUND ART

Recombinant lead acid batteries are known. An object of the present invention is to provide such a battery having improved separator characteristics.

The invention, although described with reference to batteries, is not restricted to batteries but is also applicable to single cells e.g. spirally wound cells, and the claims to batteries thus include single cells within their scope.

DISCLOSURE OF THE INVENTION

According to the present invention there is provided a recombinant lead acid electric storage battery in which the positive and negative plates in each cell are separated by separators of electrolyte and gas permeable compressible fibrous separator material comprising organic polymeric fibres, the separator material having an electrolyte absorption ratio of at least 100%, the volume E of electrolyte in the battery preferably being at least 0.8 (X+Y) where X is the total pore volume of the separators in the dry state and Y is the total pore volume of the positive and negative active materials in the dry fully charged state, the battery at least when fully charged having substantially no free unabsorbed electrolyte whereby substantial oxygen gas recombination occurs in the battery at charging rates not in excess of C/20.

The ratio of X to Y may be in the range 6:1 to 1:1 e.g. 5.5:1 to 1.5:1 or more preferably 4:1 to 1.5:1.

The charging rate is desirably kept at not greater than C/15 and preferably less than C/20 e.g. C/20 to C/60. The volume of electrolyte is desirably in the range 0.8 (X+Y) to 0.99 (X+Y) and especially at least 0.9 (X+Y) or even at least 0.95 (X+Y). These values enable the active material to be utilized more efficiently than when lower amounts of electrolyte are used.

We have found that surprisingly oxygen gas recombination can still occur at the negative electrodes at these very high levels of saturation of the pores which is contrary to what is conventional in recombinant sealed lead acid cells.

The electrolyte active material ratio is at least 0.05 e.g. at least 0.06 or at least 0.10 and is the ratio of $H_2SO_4$ in grams to the lead in the active material on the positive and negative electrodes calculated as grams of lead.

It is preferably in the range 0.10 to 0.60 especially 0.11 to 0.55 e.g. 0.20 to 0.50.

The ratio of negative to positive active material (on a weight of lead basis) may be in the range 0.5:1 to 1.5:1 e.g. 0.6:1 to 1.4:1. The use of ratios below 1:1 is contrary to what is conventional but we find that recombinant operation can be achieved at these ratios and they have the advantage of providing more positive active material for the same cell volume. We thus prefer to use ratios in the range 0.6:1 to 0.99:1 e.g. 0.7:1 to 0.9:1.

As mentioned above the separator material is a compressible absorbent fibrous material having an electrolyte absorption ratio of at least 100% e.g. of 100 to 200% especially 110 to 170%. It is electrically non-conducting and electrolyte resistant.

Electrolyte absorption ratio is the ratio, as a percentage, of the volume of electrolyte absorbed by the wetted portion of the separator material to the dry volume of that portion of the separator material which is wetted, when a strip of the dry separator material is suspended vertically above a body of aqueous sulphuric acid electrolyte of 1.270 SG containing 0.01% by weight sodium lauryl sulphonate with 1 cm of the lower end of the strip immersed in the electrolyte, after a steady state wicking condition has been reached at 20° C. at a relative humidity of less than 50%.

The thickness of the separator is measured with a micrometer at a loading of 10 kilpascals (1.45 psi) and a foot area of 200 square millimeters (in accordance with the method of British standard specification No. 3983). Thus the dry volume of the test sample is measured by multiplying the width and length of the sample by its thickness measured as described.

We also prefer that the separator material should have a wicking height of at least 5 cms on the above test, namely that the electrolyte should have risen to a height of at least 5 cms above the surface of the electrolyte into which the strip of separator material dips when the steady state condition has been reached, so that good electrolyte distribution is achieved in each cell.

We find that these two requirements are met by fibrous blotting paper-like materials made from polymeric fibres, especially polyester fibres, having diameters in the range 0.01 microns or less up to 10 microns, the average of the diameters of the fibres being less than 10 microns, and preferably less than 5 microns, the weight to fibre density ratio, namely the ratio of the weight of the fibrous material in grams/square meter to the density in grams/cubic centimeter of the material from which the individual fibres are made preferably being at least 20 preferably at least 30 and especially at least 50.

In a preferred form of the invention the electrolyte is an aqueous sulphuric acid electrolyte containing an amount of wetting agent effective to ensure that the electrolyte wicks up the separator to a height of at least 5 cms in the above test, e.g. an amount of at least 0.01% by weight of sodium lauryl sulphonate, and the separator has thermoplastic organic polymer fibres of diameters in the range up to 10 microns e.g. in the range 1 to 6 microns and the average of the diameters of the fibres is less than 10 microns e.g. 1 to 6 microns especially 1 to 4 microns.

Moreover the above combination of properties of the separator gives a material which is highly resistant to "treeing through", namely growth of lead dendrites from the positive electrode in a cell to the negative electrode producing short circuits, whilst at the same time even when containing large amounts of absorbed electrolyte, still providing a substantial degree of gas transmission capability.

Recombinant lead acid batteries, in which gas recombination is used to eliminate maintenance during use, operate under superatmospheric pressure e.g. from 1 bar (atmospheric pressure) upwards and due to the restricted amount of electrolyte, the high electrolyte absorption ratio of the separator, and the higher electrochemical efficiency of the negative electrode, the battery operates under the so-called "oxygen cycle". Thus oxygen generated, during charging or overcharging, at the positive is transported, it is believed, through the gas phase in the separator to the surface of the negative which is damp with sulphuric acid and there recombines with the lead to form lead oxide which is converted to lead sulphate by the sulphuric acid. Loss of water is thus avoided as is excess gas pressure inside the battery.

The higher electrochemical efficiency of the negative active material enables the negative electrode to effect recombination of the oxygen produced by the positive electrode even at the beginning of the charge cycle. Thus it may not be necessary to have an excess weight of negative active material compared to the positive active material.

However recombinant operation of the battery may be facilitated by the use of a number of features in combination.

Thus firstly one desirably provides that, under the charge and discharge conditions, under which the battery is designed to operate, the capacity of the negative electrodes in each cell will normally, and desirably always, be in excess of that of the positive electrodes.

The electrochemical efficiency of the negative electrodes is in general greater than that of the positive electrodes but it must be born in mind that the efficiency of the negative electrodes drops more rapidly than that of the positive electrodes both as the cells undergo increasing numbers of cycles of charge and discharge and as the temperature of operation is reduced below ambient (i.e. 25° C.). Excess negative capacity may thus conveniently be ensured by providing an excess of negative active material (calculated as lead) compared to the positive active material in each cell.

Secondly one provides a restricted amount of electrolyte as described above and thirdly one provides a separator, having a high electrolyte absorption ratio as also described and defined above, which is compressible, so as to conform closely to the surfaces of the electrodes, and which has wicking or capillary activity, whereby transmission of electrolyte and electrolytic conduction between the electrodes is facilitated and preserved independent of the orientation of the cell, whilst gas transmission through the open spaces in the separator is maintained so that adequate and rapid gas transmission between the electrodes is also ensured.

Use of a fibrous separator having very small fibre diameters ensures that the open spaces in the separator are highly tortuous thus fulfilling the requirement that the separator resist "treeing through" as described above.

If the charging conditions generate oxygen at a faster rate than it can be transported to the negative and react thereat, then the excess oxygen is vented from the battery.

The container of the battery is thus provided with gas venting means.

The gas venting means preferably take the form of a non-return valve so that air cannot obtain access to the interior of the battery although excess gas generated therein can escape to atmosphere.

The lid of the container may be formed with filling apertures to permit electrolyte to be introduced into each cell. The filling apertures may be closed after the electrolyte has been added but the closures should provide gas venting means or separate gas venting means should be provided.

The surface pore size of the separator can also be controlled, and thereby the resistance of the separator to "treeing through", by applying a light elevated temperature overall consolidation to one surface of the material to achieve partial fusion of the thermoplastic organic polymer fibres to each other immediately adjacent to the surface without significant consolidation in the body of the separator. Clearly this surface fusion must not be such as to destroy the proposity of the surface, merely it must reduce the pore size of the surface.

The calendering at the surface of the separator reduces the porosity of the separator at that surface which can be placed in proximity to the positive plate and thus reduces the tendency for "treeing through" to occur. The overall reduction in thickness of the separator is preferably such that the thickness is at least 40% e.g. 70 to 90% or 99% of the original thickness of the unconsolidated material, which may have been 0.6 to 2 mm or more.

The thermoplastic organic polymer fibres may be subjected to an oxidative treatment prior to being formed into the sheet material.

The oxidative process in designed to increase the wettability of the fibres. This improves the properties of the battery separator itself.

The oxidative process can consist of or include treatment of the fibres, e.g. of polyolefin with chromic acid, nitric acid, nitric acid-hydrochloride acid blends such as aqua regia, hypochlorite, permanganate, chlorosulphonic acid, or hydrogen peroxide, or ozone or ultraviolet radiation and this latter agent can be used in conjunction with the other agents.

Gas phase chemical treatments e.g. by corona discharge, or with ozone or ultraviolet light can also be used to increase the wettability of the fibres.

Other chemical treatments effective to increase the wettability of the polymeric fibres can also be used, for example gas phase exposure to halogens and sulphur dioxide, carbon monoxide or carbon dioxide in sunlight or ultraviolet light or other ionizing radiation to achieve halosulphonation or halocarboxylation of the fibres. The fibres must then be subjected to hydrolysis and substantially complete elimination of ions liable to interfere with the electrochemical process in the battery for example halogen ions and heavy metal ions such as chromium; this can be achieved by washing. It is preferred however to use oxidative techniques which do not introduce interfering ions. Whilst the preferred oxidative techniques reduce the need for wetting agents it may be desirable to incorporate certain selected wetting agents to reduce the internal resistance of the separator.

We prefer to use sulphonates such as alkyl aryl sulphonates, for example, sodium dodecyl benzene sulphonate, or succinates such as sulphosuccinates, for example sodium dioctyl sulphosuccinates, or quaternary ammonium wetting agents such as alkyl aryl alkyl quaternary ammonium chlorides.

BEST MODE OF CARRYING OUT THE INVENTION

The invention may be put into practice in various ways and one specific embodiment will be described by way of example to illustrate the invention with reference to the accompanying drawings, in which.

EXAMPLE 1

Figure 1:
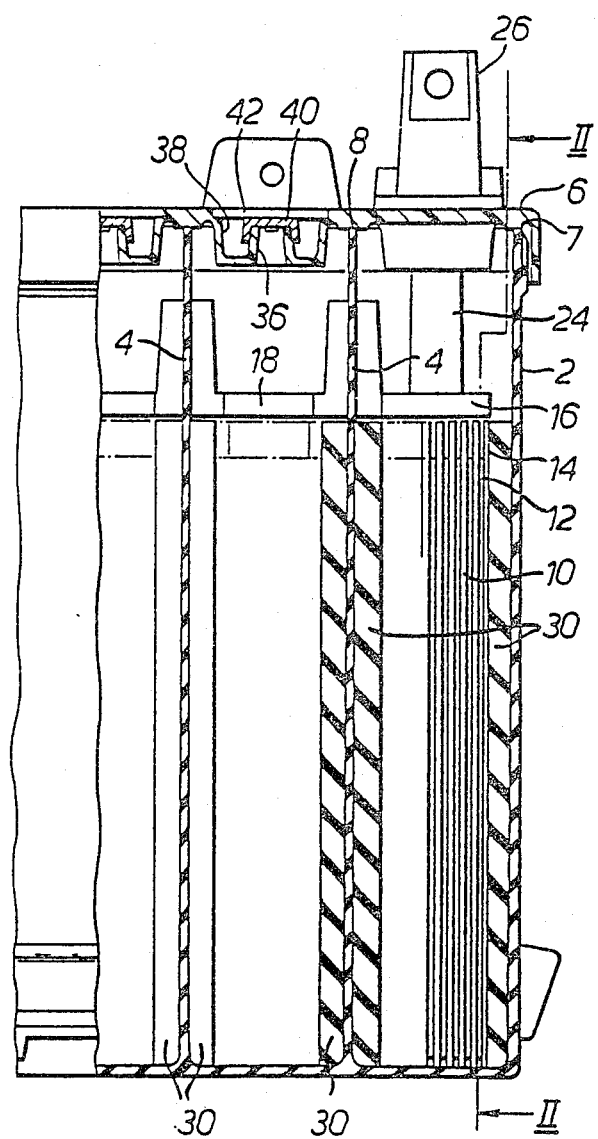
FIG. 1 is a partial cross-sectional side elevation of part of a starting, lighting and ignition battery in accordance with the present invention.
Figure 2:
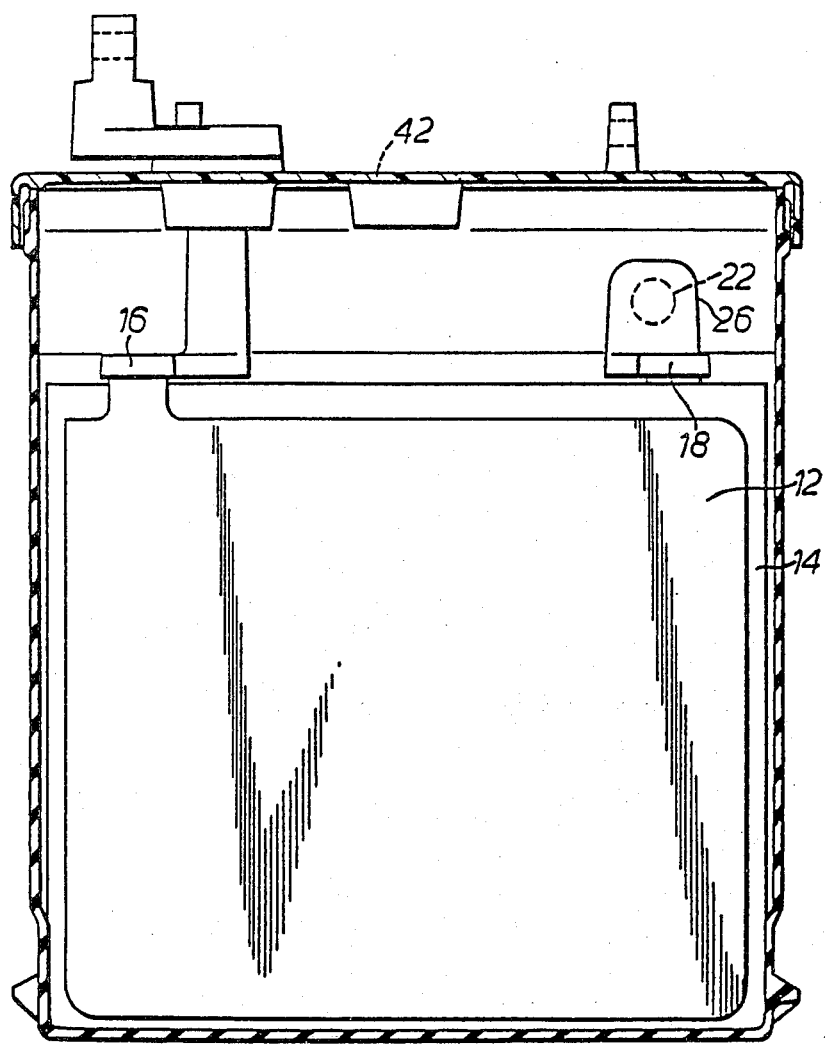
FIG. 2 is an end elevation on the line II—II of FIG. 1.

The battery has a capacity of 30 Ahr and has six cells accommodated in a container 2 made as a single moulding of polypropylene plastics material and separated from each other by integral intercell partitions 4. The cells are sealed by a common lid 6 which is connected to the walls of the container 2 at 7 and the partitions 4 at 8 by the method known as "heat sealing" in which the edges to be joined are placed in contact with opposite surfaces of a heated tool which is subsequently withdrawn and the partially melted edges are pressed together.

Each cell contains four positive plates 10 interleaved with five negative plates 12 separated from one another by separators 14 consisting of four layers of electrolyte and gas permeable compressible polyester fibre mat material whose composition and function will be described below. A double sheet of separator 14 is also placed on both outside faces of each cell. The positive plates 10 and negative plates 12 are formed from a cast grid of lead alloy containing 0.07% calcium and 0.7% tin and carry positive and negative active electrode material respectively.

The positive plate is 2.0 mms thick and the negative plate is 1.8 mms thick and are held in intimate contact with the separators by solid polypropylene packing pieces 30. Both faces of all plates are covered by separator material, which extends out above and below and on each side of the plates.

More broadly the plates may be 1 to 2 mms e.g. 1.2 to 1.9 or 1.2 to 1.6 mms thick.

The positive active material had the following composition before being electrolytically formed: Hardinge grey oxide 13640 parts, fibre 6 parts, water 1800 parts, 1.40 SG aqueous sulphuric acid 750 parts. The paste had a density of 4.2 gr/cc.

The negative active material had the following composition before being electrolytically formed: Hardinge oxide 13640 parts, fibre 3 parts, barium sulphate 68 parts, carbon black 23 parts, stearic acid 7 parts, Vanisperse CB (a lignosulphonate) 41 parts, water 1525 parts, 1.40 SG aqueous sulphuric acid 875 parts. The paste had a density of 4.3. Vanisperse CB is described in British patent specification No. 1,396,308.

As the active material has sulphuric acid added to it, its porosity decreases. When the active material is charged its porosity increases and in the fully charged condition is about the same as it is in the unformed state before addition of electrolyte.

Each positive plate carried 109 grams of active material on a dry weight basis.

Each negative plate carried 105 grams of active material on a dry weight basis.

Figure 3:
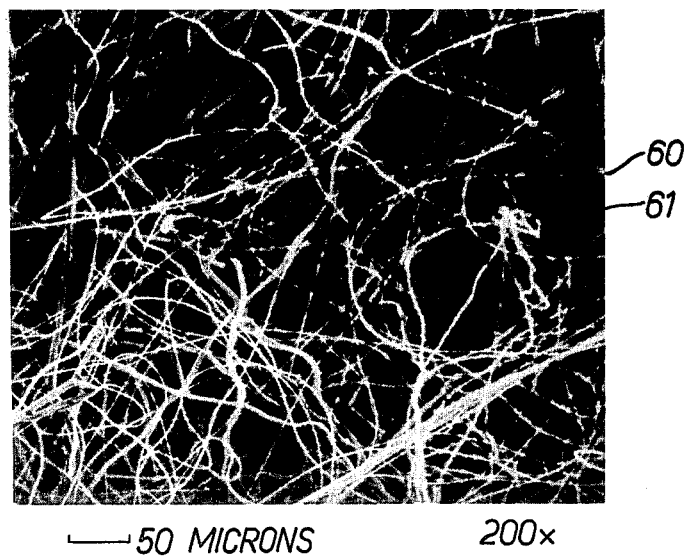
FIG. 3 is an electron scanning photomicrograph of a preferred separator material at 200 fold magnification.
Figure 4:
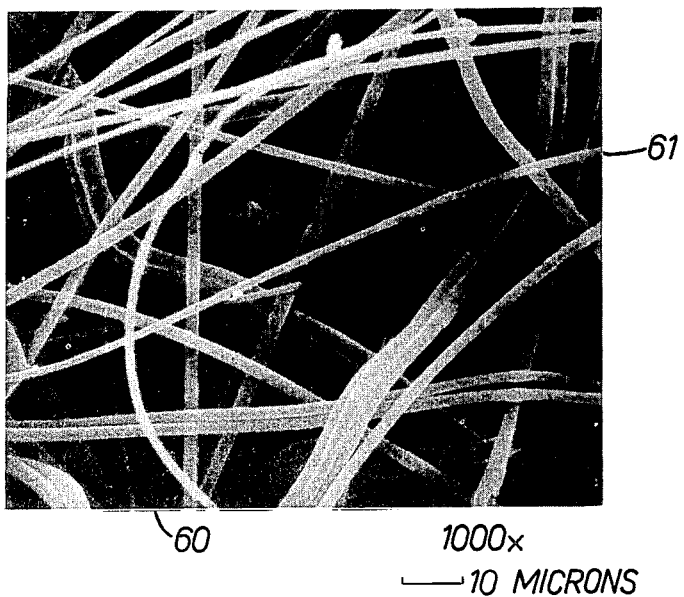
FIG. 4 is a view similar to FIG. 3 at 1000 fold magnification.

Each sheet of the separators 14 is a highly absorbent short staple fibre polyester matting, about 0.3 mm thick, there being fibres 61 as thin as 1 micron and fibres 60 as thick as 6 microns in diameter, the average of the diameter of the fibres being about 2.0 microns. FIGS. 3 and 4 show this material at different magnifications, FIG. 3 at 200 fold and FIG. 4 at 1000 fold.

It will be observed that the material whilst highly absorbent still has a very large amount of open space between the individual fibres. The material when tested for its wicking and electrolyte absorption capabilities by being suspended vertically above a body of sulphuric acid of 1.270 SG containing 0.01% by weight of sodium lauryl sulphonate with 1 cm of its end dipping in the electrolyte in an atmosphere of 20° C. and a relative humidity of less than 50% absorbs electrolyte so that the liquid has wicked up to a height of 5 cms after 2 hours and this is the steady state condition. This 5 cms of material absorbs 132% of its own dry volume of electrolyte, and this is its electrolyte absorption ratio.

Each sheet of the separator 14 weighs 50 grams/square meter and has a porosity of about 90% as measured by mercury intrusion penetrometry. The density of the polyester from which the fibres of the separator are made is 1.32 gr/cc; the weight to fibre density ratio is thus 39 for each sheet or 151 for the complete separator.

Each sheet of separator material is 0.3 mms thick and weighs 50 grams/square meter. The total volume of separator used for each cell is 283 cc which has a pore volume of 214 cc and a porosity of 90% before being placed in the cell. When in the cell the volume of separator is 218 cc and the pore volume is 183 cc. This is the value of X. The weight of separator present in each cell is 42 grams.

The electrical resistance of the 0.3 mm thick separator was measured by placing it between two flat lead sheets having an area of 25.1 square cms immersed in the above electrolyte and allowed to soak for ½ hour, 2 hours and 24 hours before measuring the resistance in milliohms. The values were 3.5, 1.5 and 1.0 but without the wetting agent the values were 296, 8.0 and 1.5.

The separators being compressible conform closely to the surfaces of the plates thus facilitating electrolyte transfer and ionic conduction between the plates via the separator.

The total geometric surface are of the positive plates in each cell is 767 square centimeters and of the negative plates 959 square centimeters. The dry weight of active material of the positive plates is $4 \times 109 \times 1.07$ i.e. 468 grams (as $PbO_2$ i.e. 405 grams as lead) and that of the negatives is $5 \times 105 \times 0.93$ i.e. 490 grams (as lead) an excess of 4.7% negative active material based on the weight of the positive active material (21% as lead). The total weight of the grids is 763 grams.

The true density of the positive active material ($PbO_2$) in the fully charged state is 9 gr/cc and the true density of the negative active material (sponge lead) in the fully charge state is 10.5 gr/cc.

The true volume of the positive active material is $4 \times 109 \div 9$ i.e. 48.4 ccs and the true volume of the negative active material is $5 \times 105 \div 10.5$ i.e. 50 ccs.

The apparent density of the dry positive active material is 4.2 gr/cc and thus the apparent volume of the dry positive active material is $4 \times 109 \div 4.2$ i.e. 103.8 ccs. The apparent density of the dry negative active material is 4.4 gr/cc and thus the apparent volume of the dry negative active material is $5 \times 105 \div 4.4$ i.e. 119.3 ccs.

Thus the pore volume of the positive active material is 55.4 ccs and of the negative active material is 69.3 ccs and the total pore volume of the dry fully charged active material is 124.7 ccs, which is the value of Y. The ratio of X to Y is 1.47:1. (X+Y) is 307.7.

The calculated true surface area for the positive active material is 1170 square meters and for the negative is 220 square meters using a factor of 0.4 square meter/gram for the negative active material and 2.5 square meters/gram for the positive active material.

Each dry electrolytically unformed cell was evacuated to a high vacuum and had 325 ml i.e. 1.06 (X+Y) of 1.275 SG aqueous sulphuric acid (i.e. 153 grams of sulphate ion) added to the unformed cell. The cells were then allowed to cool to 40° C. (1 to 2 hours) and electrolytically formed and 34.5 cc of water was electrolysed off, the specific gravity of the electrolyte thus rising.

The electrolytic forming regime comprised: 4 hours at 11 amps, 17 hours at 5.5 amps, 7 hours at 2.7 amps and 20 hours at 2.2 amps.

The amount of electrolyte remaining is thus 0.94 (X+Y).

The battery contained 0.7 ml of 1.275 SG aqueous sulphuric acid per gram of positive active material (as lead) and 0.66 ml of 1.275 SG aqueous sulphuric acid per gram of negative active material as lead. The battery contained 0.34 ml of 1.275 SG aqueous sulphuric acid per gram of positive and negative active material combined (as lead).

There were thus 0.4 grams of $H_2SO_4$ per gram of lead in the positive active material and 0.35 grams of $H_2SO_4$ per gram of lead in the negative active material. The electrolyte active material ratio was thus 0.18.

The battery was then tested on the following test regime and completed this regime.

4 Cycles at C/5, namely discharge at 20° C. at 8.8 amps to an end voltage of 10.2 volts followed by recharging at 14.1 volts for 24 hours.

2 Cycles of C/20 discharge, namely discharge at 20° C. at 2.2 amps to an end voltage of 10.5 volts followed by recharging at 14.1 volts for 24 hours.

1 Cycle of discharge at −18° C. at 220 amps to an end voltage of 6 volts followed by recharging at 14.1 volts for 24 hours.

1 Cycle of C/20 discharge.

1 Cycle of discharge at −18° C. as above.

The positive and negative plates are interconnected by a respective positive and negative group bar 16 and 18. Integral with the negative group bar 18 in the right hand cell as shown in FIG. 1 is a laterally projecting portion which terminates in a "flag" or upstanding portion 20 which is adjacent to the intercell partition 4 and overlies a hole 22 in the partition. The positive flag in the left hand of the two cells shown in FIG. 1 is connected to the similar negative flag in the right hand cell through the hole 22 so as to form an intercell connection by a method known as "extrusion fusion". This method comprises placing welding jaws against the two opposed flags before the lid 6 is placed in position, applying pressure so that the flags distort and meet in the hole 22 and then passing an electric current between the two welding jaws so that the material of the two flags is melted together and seals the hole 22.

The positive group bar in the right hand cell is provided with a flag 24. The flag 24 is connected to a terminal 26 in the lid of the container.

Each cell of the battery is normally sealed, that is to say that during normal operation of the battery the cells do not communicate with the atmosphere. However in case a substantial over-pressure should build up in the cell, for instance because the cell is exposed to a very high temperature or over-charged, so that oxygen gas is evolved at a faster rate than it can be combined, a relief valve is provided to exhaust the excess gas and is arranged to operate at a pressure of only 2 to 3 psi. Each valve is of the Bunsen type and comprises a passage 36 communicating with the interior of a cell and leading to the exterior of the lid. Each passage 36 is within a boss in a respective recess 38 in the lid, and the boss is sealingly covered by a resilient cap 40 having a depending skirt around the boss. The cap 40 normally seals the passage 36, but if an excessive pressure should occur in the battery the skirt of the cap lifts away from the boss to vent the cell. A disc 42 provided with a vent hole or clearance and keyed into the under cut top edge of the recess 38 engages each cap 40, thus ensuring that it is not blown off by the gas pressure, whilst allowing venting to atmosphere.

EXAMPLE 2

The battery is an automotive starting, lighting and ignition battery and is of the same structure as that described and illustrated for Example 1. However, the battery has a capacity of 25 Ahr and each of the six cells contains 3 positive plates 10 interleaved with 4 negative plates 12 separated from one another by separators 14 consisting of 2 layers of electrolyte and gas permeable compressible polyester fibre material whose composition and function will be described below. A single sheet of separator 14 is also placed on both outside faces of each cell. The positive plates 10 and negative plates 12 formed from a cast grid of lead alloy containing 0.07% calcium and 0.7% tin and carry positive and negative active electrode material respectively.

The positive and negative plates are both 1.37 mms thick.

The positive and negative active materials are the same as in Example 1.

Each positive plate carried 76 grams of active material on a dry weight basis.

Each negative plate carried 76 grams of active material on a dry weight basis.

Each sheet of the separators 14 is a highly absorbent short staple fibre polyester matting having a structure and properties as described in Example 1 but being about 0.6 mms thick.

Each sheet of the separator 14 weighs 100 grams/square meter and has a porosity of about 90% as measured by mercury intrusion penetrometry. The density of the polyester from which the fibres of the separator are made is 1.32 gr/cc; the weight to fibre density ratio is thus 78 for each sheet or 151 for the complete separator.

Each sheet of separator material is 0.6 mms thick and weighs 100 grams/square meter. The total volume of separator used for each cell is 155 cc which has a pore volume of 140 cc and a porosity of 90% before being placed in the cell. When in the cell the volume of separator is 140 cc and the pore volume is 126 cc. This is the value of X. The weight of separator present in each cell is 25 grams.

The total geometric surface area of the positive plates in each cell is 500 square centimeters and of the negative plates 667 square centimeters. The dry weight of active material of the positive plates is 3×76×1.07 i.e. 244 grams (as $PbO_2$ i.e. 211 grams as lead) and that of the negatives is 3×76×0.93 i.e. 282 grams (as lead) an excess of 15% negative active material based on the weight of the positive active material (34% as lead). The total weight of the grids is 350 grams.

The pore volume of the positive active material is 29.3 ccs and of the negative active material is 40.0 ccs and the total pore volume of the dry fully charged active material is 69.3 ccs, which is the value of Y. The ratio of X to Y is 1.81:1. (X+Y) is 195.3.

The calculated true surface area for the positive active material is 570 square meters and for the negative is 137 square meters using a factor 0.45 square meter/gram for the negative active material and 2.5 square meters/gram for the positive active material.

Each dry electrolytically unformed cell was evacuated to a high vacuum and had 230 ml i.e. 1.18 (X+Y) of 1.275 SG aqueous sulphuric acid (i.e. 108 grams of sulphate ion) added to the unformed cell. The cells were then allowed to cool to 40° C. (1 to 2 hours) and electrolytically formed and 20 cc of water was electrolysed off, the specific gravity of the electrolyte thus rising.

The electrolytic forming regime comprised: 48 hours at 2.5 amps.

The amount of electrolyte remaining is thus 1.08 (X+Y) and would thus appear by calculation to exceed the pore volume of the system in the fully charged state.

The plates and separator are thus very nearly saturated but since no venting occurs there must be sufficient gas space in the separators and plates at least at conditions approaching full charge for gas phase (oxygen) transport to be occurring at this rate of charging.

The battery contained 1.0 ml of 1.300 SG aqueous sulphuric acid per gram of positive active material (as lead) and 0.75 ml of 1.300 SG aqueous sulphuric acid per gram of negative active material as lead. The battery contained 0.42 ml of 1.300 SG aqueous sulphuric acid per gram of positive and negative active material combined (as lead).

There were thus 0.52 grams of $H_2SO_4$ per gram of lead in the positive active material and 0.39 grams of $H_2SO_4$ per gram of lead in the negative active material. The electrolyte active material ratio was thus 0.22.

5 Cells of the above design were over-charged for 900 hours at a rate of C/12 namely 2 amps constant current. After 48 hours the cells had each lost between 9.6 and 13.5 ccs of water when on a Faradaic basis one would have expected them each to have lost 31 ccs. After 144 hours they had each lost a total of between 14.9 and 19.3 ccs of water i.e. about a further 5 ccs when on a Faradaic basis one would have expected them each to have lost 72.6 ccs (a further 31 ccs). After 288 hours they had each lost a total of between 17.2 to 23.6 ccs (Faradaic loss 192 ccs). After 678 hours they had each lost a total of between 25.6 and 30.7 ccs (Faradaic loss 452 ccs). After 900 hours they had each lost a total of between 26 and 31 ccs (Faradaic loss 600 ccs). Thus over the 900 hour period the cells exhibited a recombination efficiency of 95 to 96%.

Reference has been made above to cast lead alloy grids. Whilst this is preferred the electrode pairs could be made from slit expanded sheet or be of wrought form e.g. perforated or punched sheet or from fibrous supports provided with electrically conductive coatings or deposited conductors such as are disclosed in the present applicants British applications Nos. 9876/76 and 15663/76. The grids are preferably 0.1 to 3.0 mms thick especially 1.5 to 2.5 mm thick. The preferred alloy is a lead calcium tin alloy preferably containing 0.06 to 0.13% e.g. 0.07 to 0.09% calcium and 0.3 to 0.99% tin e.g. 0.4 to 0.8% tin e.g. 0.07% calcium and 0.7% tin.

Alternative alloys include 99.9% lead and antimonial alloys such as those disclosed in U.S. Pat. Nos. 3,879,217 and 3,912,637.

Due to the fact that the cells rarely if ever communicate with the atmosphere, the battery will not need topping up with electrolyte and is therefore maintenance free. Furthermore the battery is unspillable firstly because it is sealed and secondly because there is substantially no free electrolyte in the cells, the electrolyte being retained within the microfine separators and the active material. The fact that the cells are sealed also means that no spark or explosion can propagate from the atmosphere into the battery or vice versa.

INDUSTRIAL APPLICABILITY

The invention is applicable to recombinant lead acid electric storage batteries and cells.

We claim:

1. A recombinant lead acid electric storage battery in which the positive and negative plates in each cell are separated by separators of electrolyte and gas permeable compressible fibrous separator material comprising organic polymeric fibers having diameters ranging from 0.01 $\mu$m or less up to 10 $\mu$m with an average diameter of less than 10 $\mu$m, the weight to fiber density ratio being at least 20, said separator being compressed between said plates and the separator material having a wicking height of at least 5 cms and an electrolyte absorption ratio of at least 100 percent, wherein the electrolyte volume (E) in the battery is at least 0.8(X+Y), where X is the total pore volume of the separators in the dry state and Y is the total pore volume of the positive and negative active materials in the dry fully charged state and wherein the battery at least when fully charged has substantially no free unabsorbed electrolyte whereby substantial oxygen gas recombination occurs in the battery at charging rates not in excess of C/20.

2. The recombinant lead acid battery of claim 1, wherein said electrolyte is an aqueous sulfuric acid electrolyte containing an amount of wetting agent effective to insure that the electrolyte wicks-up the separator to a height of at least 5 cms as determined in the wicking test described herein.

3. The recombinant lead acid battery of claim 1, in which the surface pore size of the separator is reduced by applying an elevated temperature over all consolidation to one surface of the material to achieve partial fusion of the thermoplastic organic polymer fibers to each other immediately adjacent to the surface without significant consolidation in the body of the separator.

4. The recombinant lead acid battery of claim 1, wherein an alkyl aryl sulfonate, a sulfosuccinate or a quaternary ammonium wetting agent is incorporated in said separator.

5. The recombinant lead acid battery of claim 4, wherein said wetting agent is sodium dodecyl benzene sulfonate, sodium dioctyl sulfosuccinate or an alkyl aryl alkyl quaternary ammonium chloride.

6. The recombinant lead acid battery of claim 1, wherein the sulfuric acid electrolyte-lead ratio is at least to 0.05 (gram weight basis).

7. The recombinant lead acid battery of claim 1, wherein the ratio of lead in the negative electrodes to lead in the positive electrodes is in the range of 0.5:1 to 1.5:1.

8. The recombinant lead acid battery of claim 1, wherein said electrolyte absorption ratio ranges from 100 to 200%.

9. The recombinant lead acid battery of claim 1, wherein the average diameter of said polymeric fibers is less than 5 $\mu$m.

* * * * *